US012325147B2

(12) United States Patent
Kurebayashi et al.

(10) Patent No.: US 12,325,147 B2
(45) Date of Patent: Jun. 10, 2025

(54) DIE SET APPARATUS

(71) Applicant: NHK SPRING CO., LTD., Yokohama (JP)

(72) Inventors: Sosuke Kurebayashi, Yokohama (JP); Naoki Iwamoto, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/157,717

(22) Filed: Jan. 25, 2021

(65) Prior Publication Data

US 2021/0237298 A1 Aug. 5, 2021

(30) Foreign Application Priority Data

Feb. 5, 2020 (JP) ................................ 2020-017781

(51) Int. Cl.
*B26D 7/00* (2006.01)
*B21D 37/10* (2006.01)
*B26F 1/40* (2006.01)

(52) U.S. Cl.
CPC .......... *B26D 7/0006* (2013.01); *B21D 37/10* (2013.01); *B26F 1/40* (2013.01)

(58) Field of Classification Search
CPC .......... B26D 7/0006; B26D 5/02; B26D 5/08; B21D 37/10; B21D 37/08; B21D 37/12; B26F 1/40
See application file for complete search history.

(56) References Cited

U.S. PATENT DOCUMENTS 2,225,145 A * 12/1940 Baumbach ............ B21D 37/10 384/13
2,325,990 A * 8/1943 Wales .................... B21D 28/02 83/140
2,376,829 A * 5/1945 Sokolowsky ........ B21D 45/006 411/395

(Continued)

FOREIGN PATENT DOCUMENTS

CN 201217035 Y * 4/2009
CN 101772623 A 7/2010

(Continued)

OTHER PUBLICATIONS

Parmley, Robert, Illustrated Sourcebook of Mechanical Components, 2000, McGraw-Hill, 16-45-16-46 (Year: 2000).*

(Continued)

*Primary Examiner* — Jonathan G Riley
(74) *Attorney, Agent, or Firm* — Holtz, Holtz & Volek PC

(57) ABSTRACT

A lift mechanism of a die set apparatus includes a guide pin, a linear motion guide member, a first washer, a second washer, a first coil spring, and a second coil spring. A first positioning portion and a second positioning portion control a first end turn portion and a second end turn portion from moving in a radial direction of the guide pin in a state where a first gap is formed between the first coil spring and the guide pin. A third positioning portion and a fourth positioning portion control a third end turn portion and a fourth end turn portion from moving in the radial direction of the guide pin in a state where a second gap is formed between the second coil spring and the guide pin.

8 Claims, 5 Drawing Sheets

(56) References Cited

U.S. PATENT DOCUMENTS

| | | | | | |
|---|---|---|---|---|---|
| 3,140,630 | A * | 7/1964 | Wolf | B21D 45/006 411/997 |
| 3,253,868 | A * | 5/1966 | Danly | F16C 33/306 384/30 |
| 3,357,755 | A * | 12/1967 | Danly | F16C 33/385 384/49 |
| 4,003,283 | A * | 1/1977 | Janiszewski | B21D 37/10 83/637 |
| 4,717,265 | A * | 1/1988 | Shioda | B23Q 11/0025 384/30 |
| 4,720,197 | A * | 1/1988 | Scharting | F16C 29/04 267/166 |
| 5,158,373 | A * | 10/1992 | Hanaway | F16C 29/04 384/30 |
| 6,193,225 | B1 * | 2/2001 | Watanabe | F16F 1/043 267/248 |
| 2010/0139596 | A1 | 6/2010 | Iwata et al. | |

FOREIGN PATENT DOCUMENTS

| | | | |
|---|---|---|---|
| CN | 103433467 | A | 12/2013 |
| CN | 105478590 | A | 4/2016 |
| CN | 208728432 | U | 4/2019 |
| CN | 209189618 | U | 8/2019 |
| JP | 2002316224 | A * | 10/2002 |
| JP | 2002336918 | A * | 11/2002 |
| JP | 2011161471 | A | 8/2011 |

OTHER PUBLICATIONS

Parmley, Robert, “Illustrated Sourcebook of Mechanical Components,” Copyright 2000. (Year: 2000).*

JP2002248530 (Year: 2002).*

Chinese Office Action dated Oct. 18, 2022 (and English translation thereof) issued in counterpart Chinese Application No. 202110137548.0.

* cited by examiner

DIE SET APPARATUS

CROSS-REFERENCE TO RELATED APPLICATIONS

This application is based upon and claims the benefit of priority from prior Japanese Patent Application No. 2020-017781, filed Feb. 5, 2020, the entire contents of which are incorporated herein by reference.

BACKGROUND OF THE INVENTION

1. Field of the Invention

The present invention relates to a die set apparatus used for press equipment for performing processing such as cutting or bending of a workpiece.

2. Description of the Related Art

In order to process an article to be processed (a workpiece), press equipment has been used from the past. JP 2002-336918 A (Patent Literature 1) and JP 2011-161471 A (Patent Literature 2) describe examples of press equipment including an upper die and a lower die. The lower die is held by a lower die holder, and the upper die is held by an upper die holder. As the upper die is moved toward the lower die, the workpiece is processed by the upper die and the lower die.

For example, in a manufacturing process of a suspension for use in a hard disk drive (HDD), precision press working is performed in a clean chamber in which cleanliness is kept at a high level. Press equipment which is to be used for the processing includes, for example, a lower die held by a lower die holder and an upper die held by an upper die holder. Further, by moving the upper die toward the lower die, cutting or bending of a workpiece (the suspension) is performed.

There is a wide variety of workpieces. Depending on the workpiece, it is necessary to avoid adhesion of fine particles, such as metal, powder, to the workpiece. For example, adhesion of fine particles to a disk drive suspension causes a trouble in an operation of a hard disk drive. Also, the fine particles adhering to the workpiece may become a factor of producing minute indentations on the workpiece during the press working, for example. Accordingly, in the disk drive suspension, it is strongly desired that the adhesion of fine particles be prevented.

A high level of cleanliness is required for the disk drive suspension. For this reason, as the processing for the disk drive suspension, oilless processing is performed inside a clean chamber in which cleanliness is controlled. In the oilless processing, pressing and cutting are performed by a die set apparatus which does not use oil. For this reason, in the oilless processing, fine particles that are produced scatter easily, and there has been a concern that the fine particles may adhere to the workpiece.

In order to urge an upper die holder in a direction of separating the upper die holder from a lower die holder, a lift mechanism is used. The lift mechanism includes a guide pin extending in an up-down direction, and a coil spring which urges the upper die holder upward. The coil spring has a length adapted to a movement stroke of the upper die holder in the up-down direction. In the case of a die set in which the upper die holder moves at a large stroke, a coil spring whose length in an axial direction (i.e., the direction along a central axis) is sufficiently large relative to a diameter (coil diameter) of the coil spring is used.

If a coil spring whose length is sufficiently large relative to the coil diameter is compressed, depending on the degree of compression, a phenomenon in which the coil spring is deformed in a crescent shape, in other words, the so-called bowing, may occur. The bowing may be referred to as buckling. When the bowing occurs in the coil spring, an inner surface of the coil spring is brought into contact with the guide pin. If the inner surface of the coil spring contacts the guide pin every time the upper die holder moves up and down, metallic fine particles are produced at a portion of contact between the coil spring and the guide pin. It is not desirable that the fine particles produced in such a way adhere to the workpiece.

BRIEF SUMMARY OF THE INVENTION

An object of the present invention is to provide a die set apparatus which can avoid occurrence of fine particles of metal and the like, and prevent the fine particles from adhering to a workpiece.

A die set apparatus of one embodiment includes a first die holder which holds a first die, a second die holder which holds a second die, a guide post, and a lift mechanism. The guide post guides the first die holder and the second die holder to move in a direction of coming close to or separating from each other. The lift mechanism urges the second die holder in a direction of separating the second die holder from the first die holder.

The lift mechanism includes a guide pin, a linear motion guide member, a first washer, a second washer, a first coil spring, a second coil spring, a first positioning portion, a second positioning portion, a third positioning portion, and a fourth positioning portion. The guide pin extends in a direction parallel to the guide post between the first die holder and the second die holder. The linear motion guide member is provided on the guide pin, and is freely movable in a direction along an axis of the guide pin. The linear motion guide member includes a first end portion and a second end portion. The first washer is provided at the first end portion of the linear motion guide member. The second washer is provided at the second end portion of the linear motion guide member.

The first coil spring includes a first end turn portion and a second end turn portion. Further, the first coil spring is arranged in such a state that it is compressed between the first die holder and the first washer. The second coil spring includes a third end turn portion and a fourth end turn portion. Further, the second coil spring is arranged in such a state that it is compressed between the second die holder and the second washer.

The first positioning portion controls the first end turn portion from moving in a radial direction of the guide pin in a state where a first gap is formed between an inner surface of the first coil spring and the guide pin. The second positioning portion controls the second end turn portion from moving in the radial direction of the guide pin in a state where the first gap is formed between the inner surface of the first coil spring and the guide pin. The third positioning portion controls the third end turn portion from moving in the radial direction of the guide pin in a state where a second gap is formed between an inner surface of the second coil spring and the guide pin. The fourth positioning portion controls the fourth end turn portion from moving in the radial direction of the guide pin in a state where the second gap is formed between the inner surface of the second coil spring and the guide pin.

According to the embodiment, it is possible to avoid occurrence of fine particles of metal and the like in a die set apparatus for use in processing of a workpiece, and prevent the fine particles from adhering to a workpiece for which cleanliness is required to be high such as a disk drive suspension.

An example of the first coil spring is formed of a first wire which is shaped to be helical. A diameter of the first coil spring having a cylindrical shape is substantially constant in a length direction of the coil spring (i.e., the direction along an axis of the first coil spring). Moreover, a cross section of the first wire (i.e., the cross section in a direction along the axis of the first coil spring) is of a flat rectangular shape in which a thickness is smaller than a width. An example of the second coil spring is formed of a second wire which is shaped to be helical. A diameter of the second coil spring having a cylindrical shape is substantially constant in a length direction of the coil spring (i.e., the direction along an axis of the second coil spring). Moreover, a cross section of the second wire (i.e., the cross section in a direction along the axis of the second coil spring) is of a flat rectangular shape in which a thickness is smaller than a width. The linear motion guide member may be a ball guide in which a plurality of balls are provided to be freely rollable in a cylindrical retainer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A die set apparatus 10 according to one embodiment will be described with reference to FIGS. 1 to 6.

Figure 1:
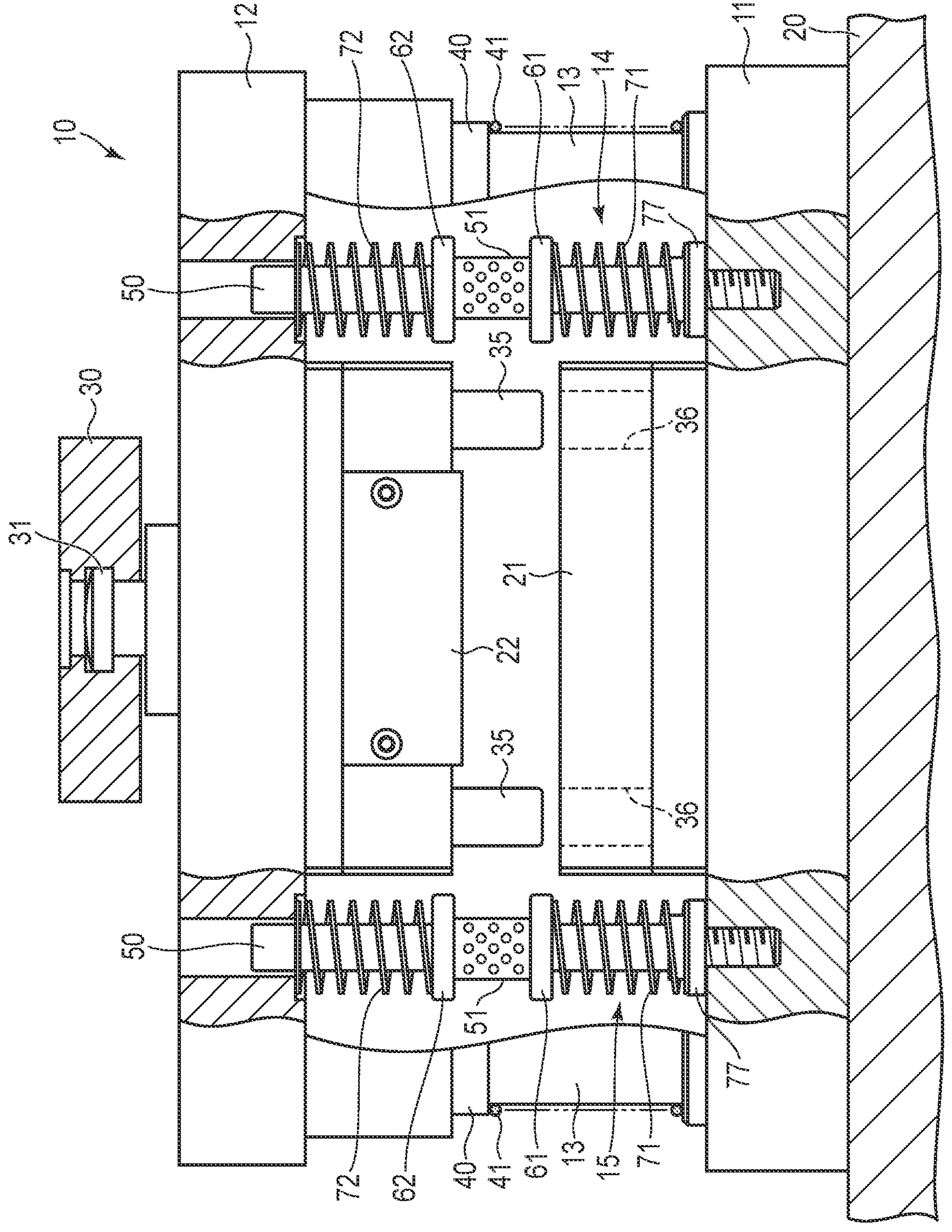
FIG. 1 is a front view of a die set apparatus according to one embodiment, which is in part shown in cross section.
Figure 2:
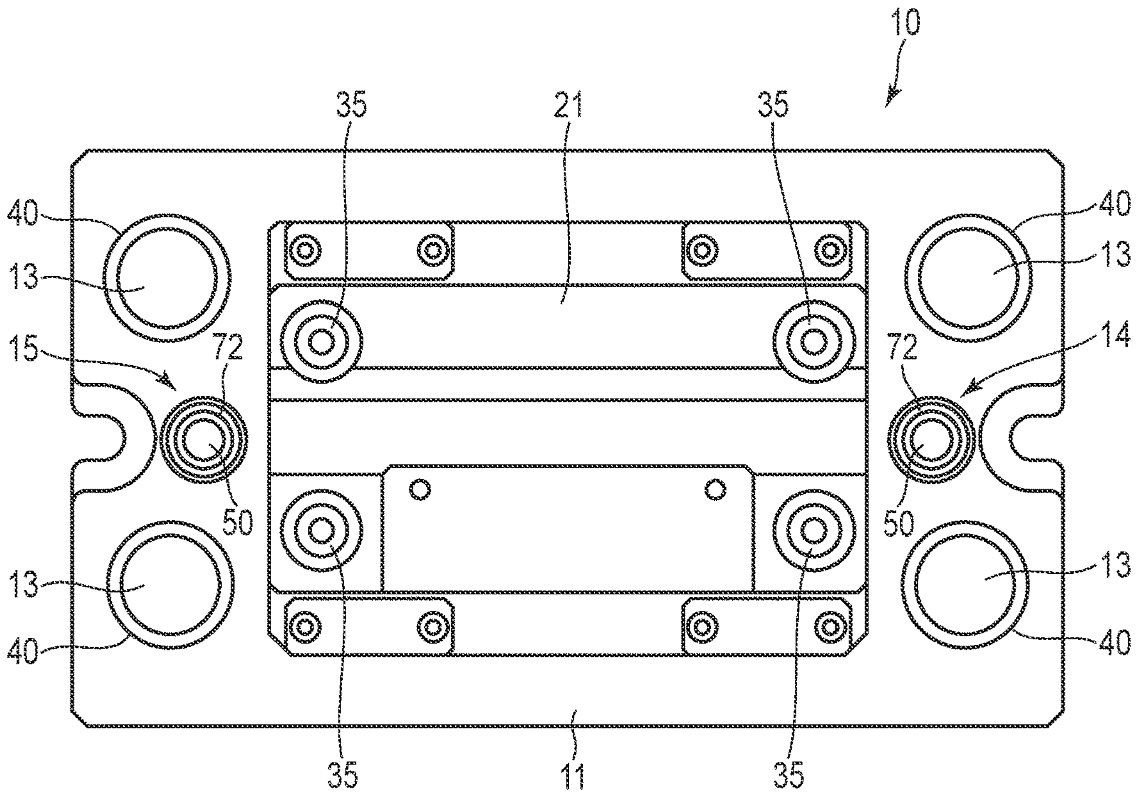
FIG. 2 is a plan view of a part of the die set apparatus shown in FIG. 1.
Figure 3:
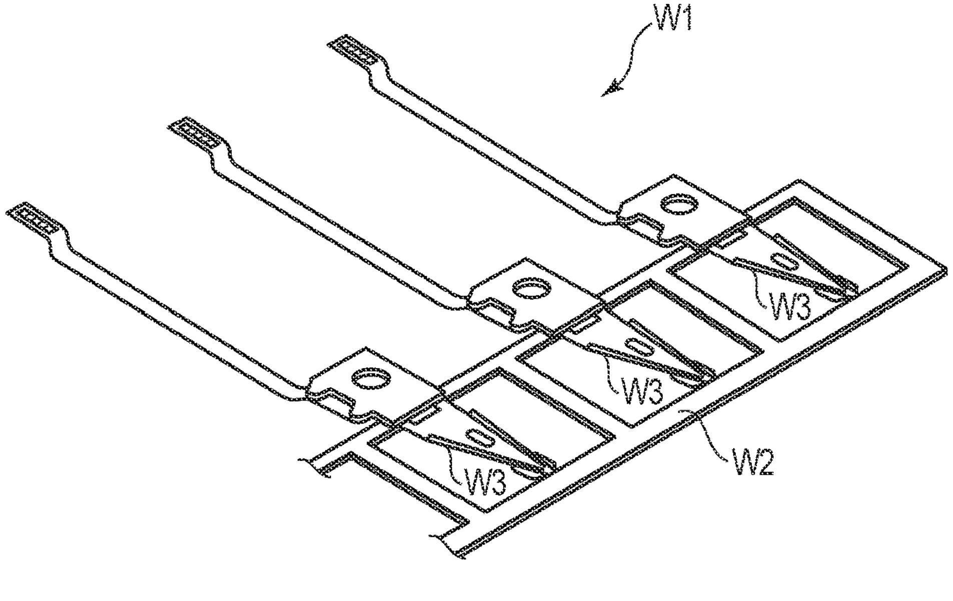
FIG. 3 is a perspective view showing an example of a workpiece.

FIG. 1 is a front view of the die set apparatus 10 which is in part shown in cross section, and FIG. 2 is a plan view of a part of the die set apparatus 10. FIG. 3 shows an example of a workpiece W1. Though the type of the workpiece W1 is arbitrary, an example of the workpiece W1 shown in FIG. 3 is a suspension chain blank which is formed in the process of manufacturing a disk drive suspension. The workpiece W1 includes a frame W2 formed of a thin metal plate, and a plurality of suspensions W3 arranged at a predetermined pitch on the frame W2.

The die set apparatus 10 includes a first die holder 11, a second die holder 12, a plurality of (four, for example) guide posts 13, and a pair of lift mechanisms (a first lift mechanism 14 and a second lift mechanism 15). The first die holder 11 is fixed on a bed 20 of press equipment. The second die holder 12 is arranged above the first die holder 11.

A first die 21 is held by the first die holder 11. A second die 22 is held by the second die holder 12. The workpiece W1 is processed by the first die 21 and the second die 22. On an upper part of the second die holder 12, a coupling portion 31, which connects with a pressure portion 30 of the press equipment, is provided. The second die holder 12 moves in a direction (up-down direction, for example) of coming close to or separating from the first die holder 11.

Figure 4:
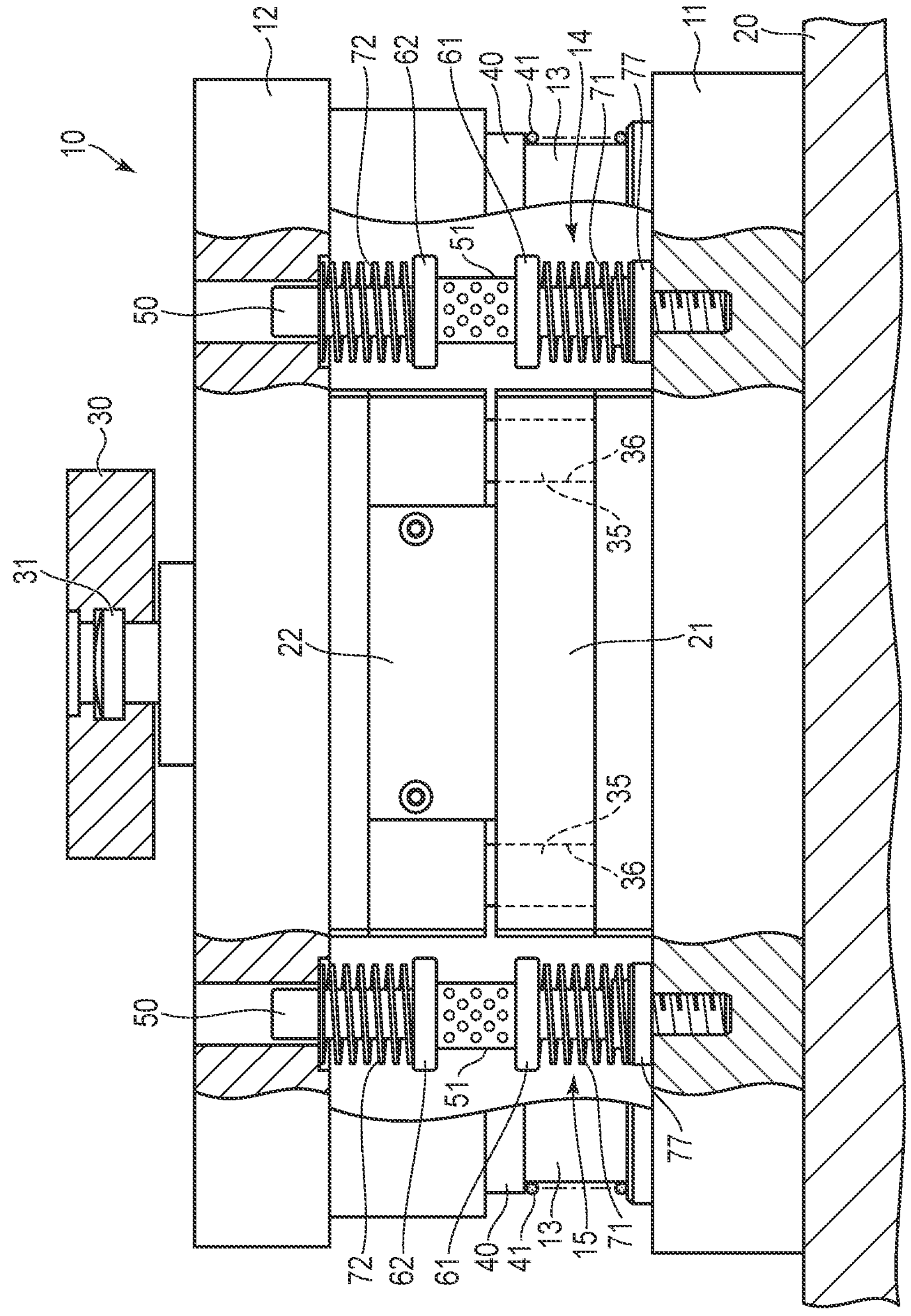
FIG. 4 is a front view which shows partly in cross section the state in which a second die holder of the die set apparatus shown in FIG. 1 is moved.

FIG. 1 shows the state in which the second die 22 is moved to be above the first die 21 (i.e., die open position). A guide member 35 is provided on the second die 22. FIG. 4 shows the state in which the second die 22 is moved to a position (die closed position) to be in contact with the first die 21. When the second die 22 is moved toward the first die 21, the guide member 35 fits into a guide hole 36 of the first die 21. As the guide member 35 is fitted into the guide hole 36, alignment of the first die 21 and the second die 22 is performed.

As shown in FIG. 2, the guide posts 13 are provided at four places of the die set, apparatus 10. These guide posts 13 have a common structure, and each have a guide bush 40 which is movable in the up-down direction. The guide bush 40 is urged upward by a spring 41 (shown in FIGS. 1 and 4). With respect to the second die holder 12, the movement in the up-down direction is guided by the guide posts 13 and the guide bushes 40.

The first lift mechanism 14 and the second lift mechanism 15 have the function of urging the second die holder 12 in a direction of separating the second die holder 12 from the first die holder 11. In the die set apparatus 10 of the present embodiment, the first die holder 11 is arranged on the lower side, and the second die holder 12 is arranged on the upper side. Thus, the first lift mechanism 14 and the second lift mechanism 15 urge the second die holder 12 upward.

The structures of the first lift mechanism 14 and the second lift mechanism 15 are common to each other. For this reason, in the following, the first lift mechanism 14 will be described as a typical example of the lift mechanism. Note that for the first lift mechanism 14 and the second lift mechanism 15 shown in FIGS. 1 and 4, common reference numbers are assigned to parts that are common to the two lift mechanisms.

Figure 5:
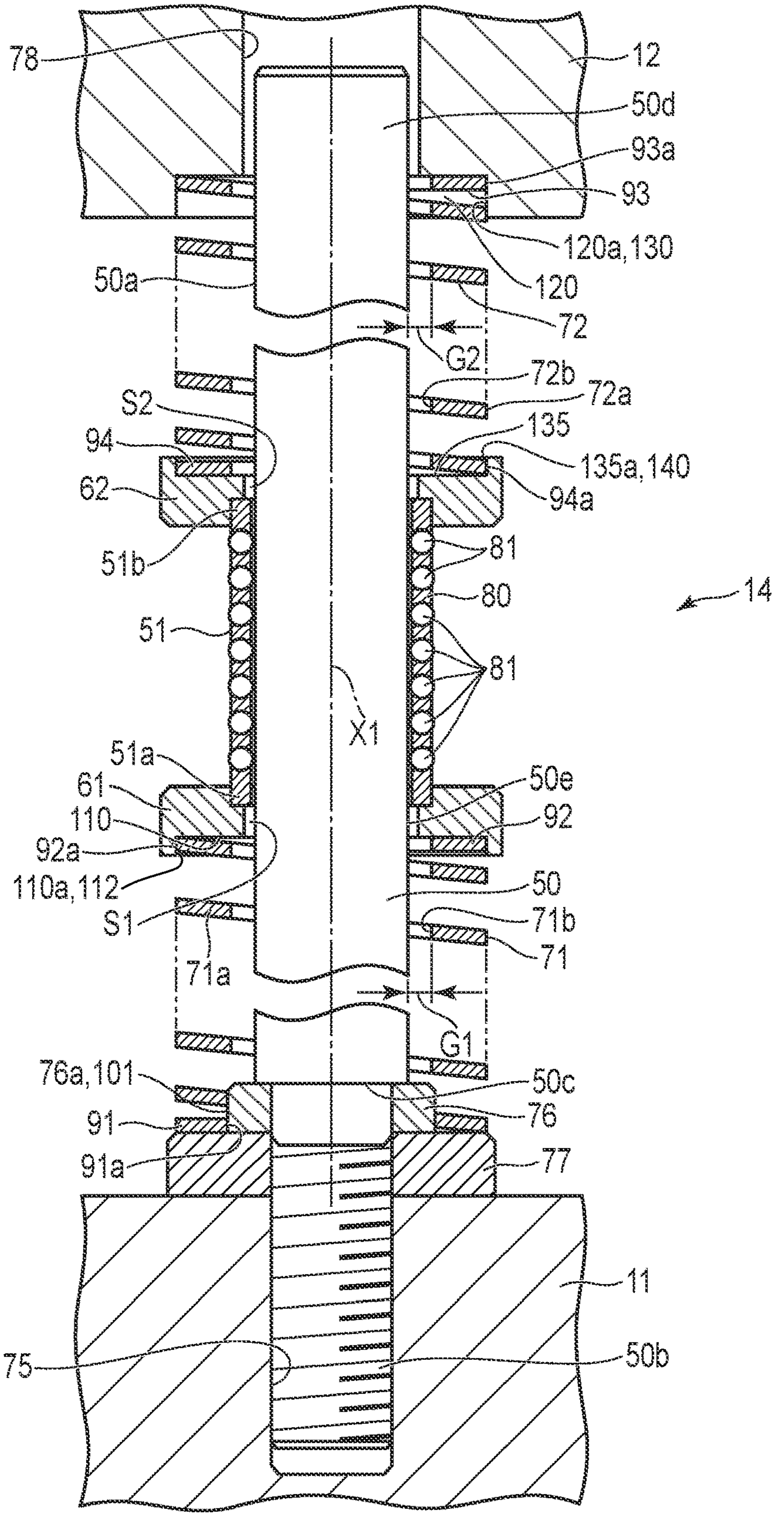
FIG. 5 is a cross-sectional view of a lift mechanism of the die set apparatus shown in FIG. 1.
Figure 6:
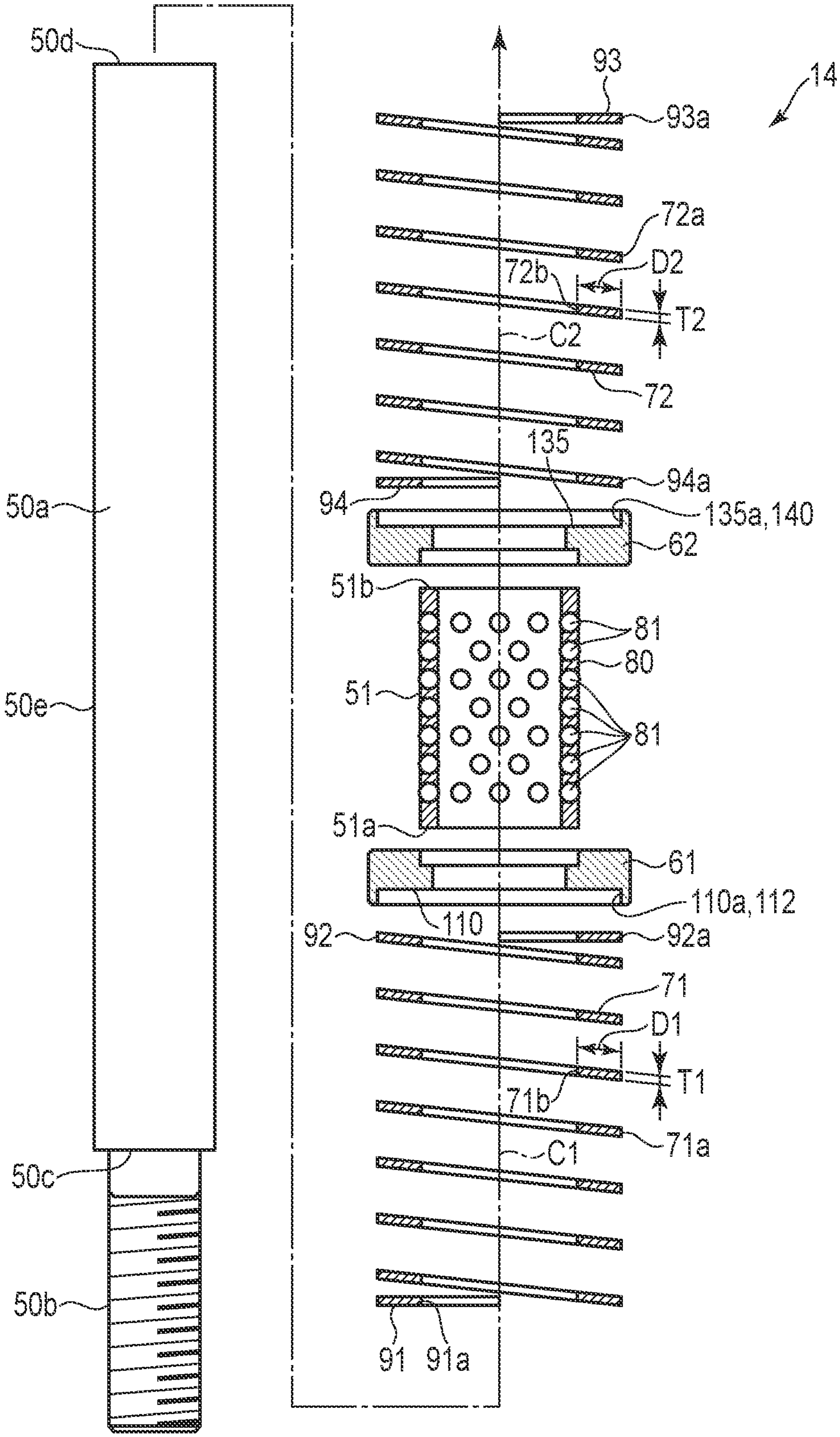
FIG. 6 is an exploded cross-sectional view of the lift mechanism shown in FIG. 5.

FIG. 5 is a cross-sectional view of the lift mechanism 14. FIG. 6 is an exploded cross-sectional view of the lift mechanism 14 shown in FIG. 5. The lift mechanism 14 includes a guide pin 50, a linear motion guide member 51, a first washer 61, a second washer 62, a first coil spring 71, and a second coil spring 72. The linear motion guide member 51 is provided on the guide pin 50.

The guide pin 50 extends in a vertical direction which is parallel to the guide post 13 (shown in FIGS. 1 and 4) between the first die holder 11 and the second die holder 12. The guide pin 50 includes a columnar pin body 50$a$, a thread portion 50$b$, and a step portion 50$c$. The pin body 50$a$ includes an axis X1 (shown in FIG. 5). The thread portion 50*b* is formed at one end (lower end) of the pin body 50*a*. The step portion 50*c* is formed between the pin body 50*a* and the thread portion 50*b*. A radial cross section of the pin body 50*a* is circular. The cross section of the pin body 50*a* is substantially constant in a direction along the axis X1.

As shown in FIG. 5, a screw hole 75 is formed in the first die holder 11. The thread portion 50*b* of the guide pin 50 is inserted into the screw hole 75. A spacer 76 and a spring receiving member 77 are arranged between the step portion 50*c* of the guide pin 50 and the first die holder 11. The thread portion 50*b* is inserted into the screw hole 75. As the thread portion 50*b* is screwed into the screw hole 75, the guide pin 50 is fixed to the first die holder 11. The other end (upper end) 50*d* of the guide pin 50 is inserted into a hole 78 formed in the second die holder 12.

The guide pin 50 is provided with the linear motion guide member 51. The linear motion guide member 51 includes a first end portion 51*a* and a second end portion 51*b*. The linear motion guide member 51 is freely movable in a direction along the axis X1 of the guide pin 50. An example of the linear motion guide member 51 is an oilless-type ball guide. The ball guide includes a cylindrical retainer 80. A plurality of balls 81 are provided to be freely rollable in the retainer 80. The ball 81 rotatably contacts an outer peripheral surface 50*e* of the guide pin 50. As another example of the linear motion guide member 51, instead of the ball guide, an oilless-type linear bush (plain guide) may be used. The linear bush may be provided such that it moves slidably in a direction along the axis X1 of the guide pin 50.

At the first end portion 51*a* of the linear motion guide member 51, the first washer 61 is provided. A gap 31 (shown in FIG. 5) is formed between an inner peripheral surface of the first washer 61 and the guide pin 50. By virtue of the gap S1, the first washer 61 is prevented from being in contact with the outer peripheral surface 50*e* of the guide pin 50. The first washer 61 is fixed to a lower end of the retainer 80 of the linear motion guide member 51.

At the second end portion 51*b* of the linear motion guide member 51, the second washer 62 is provided. A gap S2 (shown in FIG. 5) is formed between an inner peripheral surface of the second washer 62 and the guide pin 50. By virtue of the gap S2, the second washer 62 is prevented from being in contact with the outer peripheral surface 50*e* of the guide pin 50. The second washer 62 is fixed to an upper end of the retainer 80 of the linear motion guide member 51. The first washer 61 and the second washer 62 move in the direction along the axis X1 of the guide pin 50, integrally with the linear motion guide member 51.

The spring receiving member 77 and the first washer 61 are provided on the first die holder 11. The first coil spring 71 having a cylindrical shape is provided between the spring receiving member 77 and the first washer 61. An axis C1 (shown in FIG. 6) of the first coil spring 71 extends in a length direction of the first coil spring 71. The first coil spring 71 is arranged in such a state that it is compressed between the first washer 61 and the spring receiving member 77. The first coil spring 71 is arranged concentrically with the guide pin 50. The first coil spring 71 includes a first end turn portion 91 and a second end turn portion 92. The first end turn portion 91 is supported by the spring receiving member 77. The second end turn portion 92 is supported by the first washer 61. The guide pin 50 is inserted inside the first coil spring 71.

A diameter of the first coil spring 71 having the cylindrical shape is substantially constant in the length direction of the first coil spring 71. That is, the diameter of the first coil spring 71 is substantially constant in a direction along the axis C1 (shown in FIG. 6). The first coil spring 71 is formed of a first wire 71*a* which is shaped to be helical. With respect to a cross section of the first wire 71*a* (i.e., the cross section along the axis C1), a thickness T1 of the first wire 71*a* is smaller than a width D1 of the same. More specifically, the first wire 71*a* is formed of a flat steel wire whose cross section is rectangular. An inside diameter of the first coil spring 71, is greater than an outside diameter of the guide pin 50. As shown in FIG. 5, a first gap G1 is formed between the outer peripheral surface 50*e* of the guide pin 50 and an inner peripheral surface 71*b* of the first coil spring 71. The first gap G1 is formed around the entire perimeter of the inner peripheral surface 71*b*. By virtue of the first gap G1, contact between the first coil spring 71 and the guide pin 50 is avoided.

The second coil spring 72 having a cylindrical shape is provided between the second die holder 12 and the second washer 62. An axis C2 (shown in FIG. 6) of the second coil spring 72 extends in a length direction of the second coil spring 72. The second coil spring 72 is arranged in such a state that it is compressed between the second die holder 12 and the second washer 62. The second coil spring 72 is arranged concentrically with the guide pin 50. The second coil spring 72 includes a third end turn portion 93 and a fourth end turn portion 94. The third end turn portion 93 is supported by the second die holder 12. The fourth end turn portion 94 is supported by the second washer 62. The guide pin 50 is inserted inside the second coil spring 72.

A diameter of the second coil spring 72 having the cylindrical shape is substantially constant in the length direction of the second coil spring 72. That is, the diameter of the second coil spring 72 is substantially constant in a direction along the axis C2 (shown in FIG. 6). Similarly to the first coil spring 71, the second coil spring 72 is formed of a second wire 72*a* which is shaped to be helical. With respect to a cross section of the second wire 72*a* (i.e., the cross section along the axis C2), a thickness T2 of the second wire 72*a* is smaller than a width D2 of the same. More specifically, the second wire 72*a* is formed of a flat steel wire whose cross section is rectangular. An inside diameter of the second coil spring 72 is greater than an outside diameter of the guide pin 50. As shown in FIG. 5, a second gap G2 is formed between the outer peripheral surface 50*e* of the guide pin 50 and an inner peripheral surface 72*b* of the second coil spring 72. The second gap G2 is formed around the entire perimeter of the inner peripheral surface 72*b*. By virtue of the second gap G2, contact between the second coil spring 72 and the guide pin 50 is avoided.

The specifications (the number of turns, pitch, spring constant, etc.) of the first coil spring 71 and the second coil spring 72 are common to each other. Since the first coil spring 71 and the second coil spring 72 are commonalized, the type of the coil spring to be used for the lift mechanisms 14 and 15 can be reduced. Note that the specifications (the number of turns, pitch, spring constant, etc.) of the first coil spring 71 and the second coil spring 72 may be different from each other according to the purpose.

As shown in FIG. 5, the spacer 76 is arranged at an inner side of the first end turn portion 91. A position of an inner peripheral surface 91*a* of the first end turn portion 91 is restricted by an outer peripheral surface 76*a* of the spacer 76. The outer peripheral surface 76*a* of the spacer 76 serves as a first positioning portion 101. The first positioning portion 101 controls the first end turn portion 91 from moving in a radial direction of the guide pin 50. That is, in a state where the first gap G1 is formed between the inner peripheral surface 71*b* of the first coil spring 71 and the guide pin 50, the first positioning portion 101 controls the first end turn portion 91 from moving in the radial direction of the guide pin 50.

A recess 110 is formed on a lower surface of the first washer 61. The second end turn portion 92 is inserted into the recess 110. A position of an outer peripheral surface 92*a* of the second end turn portion 92 is restricted by an inner peripheral surface 110*a* of the recess 110. The inner peripheral surface 110*a* of the recess 110 serves as a second positioning portion 112. The second positioning portion 112 controls the second end turn portion 92 from moving in the radial direction of the guide pin 50. That is, in a state where the first gap G1 is formed between the inner peripheral surface 71*b* of the first coil spring 71 and the guide pin 50, the second positioning portion 112 controls the second end turn portion 92 from moving in the radial direction of the guide pin 50.

As shown in FIG. 5, a recess 120 is formed on a lower surface of the second die holder 12. The third end turn portion 93 is inserted into the recess 120. A position of an outer peripheral surface 93*a* of the third end turn portion 93 is restricted by an inner peripheral surface 120*a* of the recess 120. The inner peripheral surface 120*a* of the recess 120 serves as a third positioning portion 130. The third positioning portion 130 controls the third end turn portion 93 from moving in, the radial direction of the guide pin 50. That is, in a state where the second gap G2 is formed between the inner peripheral surface 72*b* of the second coil spring 72 and the guide pin 50, the third positioning portion 130 controls the third end turn portion 93 from moving in the radial direction of the guide pin 50.

A recess 135 is formed on an upper surface of the second washer 62. The fourth end turn portion 94 is inserted into the recess 135. A position of an outer peripheral surface 94*a* of the fourth end turn portion 94 is restricted by an inner peripheral surface 135*a* of the recess 135. The inner peripheral surface 135*a* of the recess 135 serves as a fourth positioning portion 140. The fourth positioning portion 140 controls the fourth end turn portion 94 from moving in the radial direction of the guide pin 50. That is, in a state where the second gap G2 is formed between the inner peripheral surface 72*b* of the second coil spring 72 and the guide pin 50, the fourth positioning portion 140 controls the fourth end turn portion 94 from moving in the radial direction of the guide pin 50.

An action of the die set apparatus 10 of the present embodiment will be described below.

An example of the workpiece W1 is a suspension chain blank (shown in FIG. 3). The workpiece W1 may be a product other than the suspension chain blank. The workpiece W1 is processed by the first die 21 and the second die 22.

FIG. 1 shows the state in which the second die holder 12 is in an elevated position (die open position), in other words, the second die 22 is away from the first die 21. The workpiece W1 is brought onto the first die 21. After that, the second die holder 12 is lowered by the pressure portion 30 of the press equipment. When the second die holder 12 is lowered, the second die 22 is moved toward the first die 21.

As shown in FIG. 4, the second die holder 12 is moved to a lowered position. When the second die holder 12 is moved to the lowered position, the first coil spring 71 and the second coil spring 72 are compressed. Accordingly, the length of each of the first coil spring 71 and the second coil spring 72 is reduced. Also, the linear motion guide member 51 is moved downward. Further, the workpiece W1 is processed between the first die 21, and the second die 22. For example, a part of the workpiece W1 is cut or bent.

When the second die holder 12 is moved from the elevated position to the lowered position, the coil springs 71 and 72 are compressed. The amount of compression of the coil springs 71 and 72 depends on a movement stroke of the second die holder 12 in the up-down direction. When the amount of movement of the second die holder 12 is large, the amount of compression of the coil springs 71 and 72 is also large. If bowing occurs when the coil springs 71 and 72 are compressed and the lengths thereof are reduced, the inner surfaces of the coil springs 71 and 72 may contact the guide pin 50.

Therefore, in the die set apparatus 10 of the present embodiment, movement of the first end turn portion 91 in the radial direction of the guide pin 50 is restrained by the first positioning portion 101. Further, movement of the second end turn portion 92 in the radial direction of the guide pin 50 is restrained by the second positioning portion 112. Consequently, the first gap G1 is secured. For this reason, even if the first coil spring 71 extends and retracts repeatedly, it is possible to prevent the inner peripheral, surface 71*b* of the first coil spring 71, and the guide pin 50 from being in contact with each other.

Also, movement of the third end turn portion 93 in the radial direction of the guide pin 50 is restrained by the third positioning portion 130. Further, movement of the fourth end turn portion 94 in the radial direction of the guide pin 50 is restrained by the fourth positioning portion 140. Consequently, the second gap G2 is secured. For this reason, even if the second coil spring 72 extends and retracts repeatedly, it is possible to prevent the inner peripheral surface 72*b* of the second coil spring 72 and the guide pin 50 from being in contact with each other.

In a conventional die set apparatus, a long coil spring adapted to a distance between the first die holder and the second die holder has been used. Therefore, when the coil spring is compressed, there has been a case where bowing (buckling) occurs, and the inner surface of the coil spring is brought into contact with the guide pin. In particular, with respect to a coil spring formed of a wire having a circular cross section, the greater the length of the coil spring is, the more the bowing is likely to occur.

In contrast, in the die set apparatus 10 of the present embodiment, the spring of the lift mechanism is separated into two springs, which are the first coil spring 71 and the second coil spring 72. Further, the cross section of each of the wires 71*a* and 71*b* of the coil springs 71 and 72 is of a flat rectangular shape. Moreover, the linear motion guide member 51 is provided between the first coil spring 71 and the second coil spring 72. That is, the first coil spring 71 and the second coil spring 72 are arranged in series via the linear motion guide member 51. Consequently, even if the first coil spring 71 and the second coil spring 72 are compressed, it is possible to prevent the bowing from occurring. It is thereby possible to prevent the respective inner surfaces of the coil springs 71 and 72 from being in contact with the guide pin.

After the workpiece W1 has been processed, the pressure portion 30 is elevated, whereby the second die holder 12 is elevated. Accordingly, the second die 22 is separated from the first die 21. The second die holder 12 is elevated as shown in FIG. 1. Consequently, the amount of compression of the first coil spring 71 and the second coil spring 72 is decreased, and the lengths of the coil springs are increased. Simultaneously with the above, the linear motion guide member 51 is moved upward.

In the die set apparatus 10 of the present embodiment, when the workpiece is to be processed, the second die holder 12 is moved in the up-down direction relative to the first die holder 11. Even if the second die holder 12 is moved in the up-down direction relative to the first die holder 11, it is possible to prevent the first coil spring 71 and the second coil spring 72 from being in contact with the guide pin 50. Consequently, occurrence of fine particles caused by the coil springs 71 and 72 being in contact with the guide pin 50 is suppressed. Thus, it is possible to avoid adhesion of the fine particles to the workpiece, and the workpiece can be kept in a clean state.

The first coil spring 71 is formed of the first wire 71*a* whose cross section is flat. The cross section of the first wire 71*a* is of a rectangular shape in which the thickness T1 is smaller than the width D1. That is, the first wire 71*a* is flat in a direction in which the coil spring 71 extends and retracts. The second coil spring 72 is also formed of the second wire 72*a* whose cross section is flat. The cross section of the second wire 72*a* is of a rectangular shape in which the thickness T2 is smaller than the width D2. That is, the second wire 72*a* is flat in a direction in which the coil spring 72 extends and retracts. As compared to a general coil spring formed of a wire having a circular cross section, in the coil springs 71 and 72 which are formed of the wires 71*a* and 72*a* as described above, a close-contact length at maximum compression can be reduced.

Since the close-contact length of each of the first coil spring 71 and the second coil spring 72 is small, a stroke of deflection which takes place when the coil spring extends and retracts can be made large. In the present embodiment, the linear motion guide member 51 of a predetermined length is arranged between the first coil spring 71 and the second coil spring 72. Despite the above arrangement, since the close-contact length is small in both of these coil springs 71 and 72, a stroke of deflection, which is sufficiently larger than a movement stroke which takes place when the die holder 12 is moved in the up-down direction, can be secured.

Needless to say, in implementing the present invention, each member which constitutes the die set apparatus may be modified variously. For example, the first die holder, the second die holder, and the lift mechanism may be modified variously n the implementation. A lateral arrangement type die set apparatus in which a second die holder is moved in a horizontal direction relative to a first die holder may be employed. Also, the guide pin and the linear motion guide member, the first washer, the second washer, the first coil spring, the second coil spring, and the first to fourth positioning portions may be embodied in a variety of other forms as necessary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A die set apparatus comprising:

a first die holder which holds a first die;

a second die holder which holds a second die;

a first guide mechanism comprising a guide post which guides relative movement between the first die holder and the second die holder in an up-down direction;

a second guide mechanism which guides relative movement between the first die and the second die in directions of coming together and of separating from each other, the second guide mechanism comprising a guide member which fits into a guide hole of the first die in a state where the second die is moved toward the first die; and a third guide mechanism comprising a lift mechanism which urges the second die holder in a direction of separating the second die holder from the first die holder, wherein the lift mechanism comprises:

a guide pin extending in a direction parallel to the guide post between the first die holder and the second die holder;

a linear motion guide member provided on the guide pin, the linear motion guide member comprising a cylindrical retainer and a plurality of balls provided to be rollable in the cylindrical retainer, the linear motion guide member including a first end portion at a lower end thereof and a second end portion at an upper end thereof, and the linear motion guide member being movable in a direction along an axis of the guide pin;

a first washer fixed to the first end portion of the linear motion guide member, the first washer comprising a first recess formed on a lower surface of the first washer, and an outer diameter of the first washer being larger than an outer diameter of the linear motion guide member including the cylindrical retainer and the plurality of balls;

a second washer fixed to the second end portion of the linear motion guide member, the second washer comprising a second recess formed on an upper surface of the second washer, and an outer diameter of the second washer being larger than the outer diameter of the linear motion guide member;

a flat-type first coil spring formed of a first wire which is shaped cylindrically, a cross section of the first wire being a flat rectangular shape in which a thickness of the first wire is smaller than a width of the first wire, and an outer diameter of the flat-type first coil spring being larger than the outer diameter of the linear motion guide member, the flat-type first coil spring including a flat first end turn portion, a flat second end turn portion, and first flat turn parts provided between the flat first end turn portion and the flat second end turn portion, the flat-type first coil spring being arranged between the first die holder and the first washer, the flat-type first coil spring including a first opening defined between each adjacent pair of the first flat turn parts in a state where the flat-type first coil spring is compressed when the first die and the second die are brought together, and the flat second end turn portion being connected to the first end portion of the linear motion guide member via the first washer in a state in which the flat second end turn portion is inserted in the first recess;

a flat-type second coil spring formed of a second wire which is shaped cylindrically, a cross section of the second wire being a flat rectangular shape in which a thickness of the second wire is smaller than a width of the second wire, and an outer diameter of the flat-type second coil spring being larger than the outer diameter of the linear motion guide member, the flat-type second coil spring including a flat third end turn portion, a flat fourth end turn portion, and second flat turn parts provided between the flat third end turn portion and the flat fourth end turn portion, the flat-type second coil spring being arranged between the second die holder and the second washer, the flat-type second coil spring including a second opening defined between each adjacent pair of the second flat turn parts in a state where the flat-type second coil spring is compressed when the first die and the second die are brought together, and the flat fourth end turn portion being connected to the second end portion of the linear motion guide member via the second washer in a state in which the flat fourth end turn portion is inserted in the second recess;

a first positioning portion comprising an outer peripheral surface of a spacer which is inserted at the flat first end turn portion, the first positioning portion controlling the flat first end turn portion from moving in a radial direction of the guide pin in a state where a first gap is formed between an inner peripheral surface of the flat-type first coil spring and the guide pin;

a second positioning portion comprising an inner peripheral surface of the first recess into which the flat rectangular shaped first wire of the flat second end turn portion is inserted, the second positioning portion controlling the flat second end turn portion from moving in the radial direction of the guide pin in the state where the first gap is formed between the inner peripheral surface of the flat-type first coil spring and the guide pin;

a third positioning portion comprising an inner peripheral surface of a recess which is formed on the second die holder and into which the flat third end turn portion is inserted, the third positioning portion controlling the flat third end turn portion from moving in the radial direction of the guide pin in a state where a second gap is formed between an inner peripheral surface of the flat-type second coil spring and the guide pin; and a fourth positioning portion comprising an inner peripheral surface of the second recess into which the flat rectangular shaped second wire of the flat fourth end turn portion is inserted, the fourth positioning portion controlling the flat fourth end turn portion from moving in the radial direction of the guide pin in the state where the second gap is formed between the inner peripheral surface of the flat-type second coil spring and the guide pin.

2. The die set apparatus of claim 1, wherein:

the outer diameter of the flat-type first coil spring is substantially constant in a length direction of the coil spring; and the outer diameter of the flat-type second coil spring is substantially constant in a length direction of the coil spring.

3. The die set apparatus of claim 1, wherein the first guide mechanism comprises:

a guide bush arranged in the second die holder and movable along the guide post in the up-down direction; and a spring which urges the guide bush upward along the up-down direction.

4. The die set apparatus of claim 1, wherein the flat-type first coil spring and the flat-type second coil spring are simultaneously compressed when the first die and the second die are brought together.

5. The die set apparatus of claim 4, wherein the first opening defined between each adjacent pair of the first flat turn parts is maintained in a state where the first die and the second die are closest to one another along the up-down direction.

6. The die set apparatus of claim 1, wherein the flat-type second coil spring is arranged above the flat-type first coil spring.

7. The die set apparatus of claim 1, wherein the outer diameter of the flat-type second coil spring is equal to the outer diameter of the flat-type first coil spring.

8. The die set apparatus of claim 1, wherein the flat first end turn portion is connected to the first die holder via a spring receiving member, and the flat third end turn portion is connected to the second die holder.

* * * * *